United States Patent [19]

Beatson et al.

[11] 4,257,260
[45] Mar. 24, 1981

[54] PRESSURE SENSING APPARATUS AND ENGINE ANALYZING APPARATUS

[76] Inventors: Michael F. F. Beatson, Promiano 50021 Barberino Valdelsa, Florence, Italy; Terence M. Nunn, 5a Castle St., Dover, Kent, England

[21] Appl. No.: 132,448

[22] Filed: Mar. 21, 1980

Related U.S. Application Data

[63] Continuation-in-part of Ser. No. 9,908, Feb. 6, 1979, abandoned, which is a continuation-in-part of Ser. No. 810,454, Jun. 27, 1977, Pat. No. 4,146,875.

[30] Foreign Application Priority Data

Feb. 8, 1978 [GB] United Kingdom ............ 5132/78
Feb. 8, 1978 [GB] United Kingdom ............ 5133/78
Apr. 25, 1979 [GB] United Kingdom ........... 14302/79

[51] Int. Cl.³ .................................................. G01F 9/00
[52] U.S. Cl. ...................................... 73/119 A; 73/727
[58] Field of Search .................... 73/119 A, 115, 714, 73/726, 727; 310/338

[56] References Cited

U.S. PATENT DOCUMENTS

| 3,866,473 | 2/1975 | Teitelbaum et al. | 73/726 |
| 3,942,049 | 3/1976 | Hyanora et al. | 73/119 A X |
| 4,090,404 | 5/1978 | Dupont et al. | 73/119 A |

*Primary Examiner*—Jerry W. Myracle

[57] ABSTRACT

There is disclosed apparatus for sensing cyclically varying pressure in a pipe, particularly but not exclusively for sensing pressure in fuel lines. The apparatus depends on resilient elements which bend symmetrically on pressure change, and transducers producing equal and opposite signals depending on the bending strain. In the first form of apparatus, a ring surrounds the pipe and bears upon it through screws at four spaced points. The ring is on two portions, to be assembled around the pipe. When so assembled, the ring portions bend as beams when the pipe dilates. Symmetrical piezoelectric crystals detect this bending. The second form of apparatus described comprises a pair of similar sensing members in the form of blocks each shaped to embrace a pipe over an arc and to make line contact with the pipe at two spaced locations; the blocks are removably clamped about the pipe. A transducer on each block provides electrical signals in dependence on bending strain in the block due to periodic dilatation of the pipe. The third form of apparatus also employs a pair of similar sensing members each shaped to embrace a pipe over an arc and to make line contact with the pipe at two spaced locations are removably clamped about the pipe. The third form of sensing apparatus also uses transducers one on each member, to provide equal and opposite electrical signals in dependence on bending strain in the members due to period dilation of the pipe.

29 Claims, 33 Drawing Figures

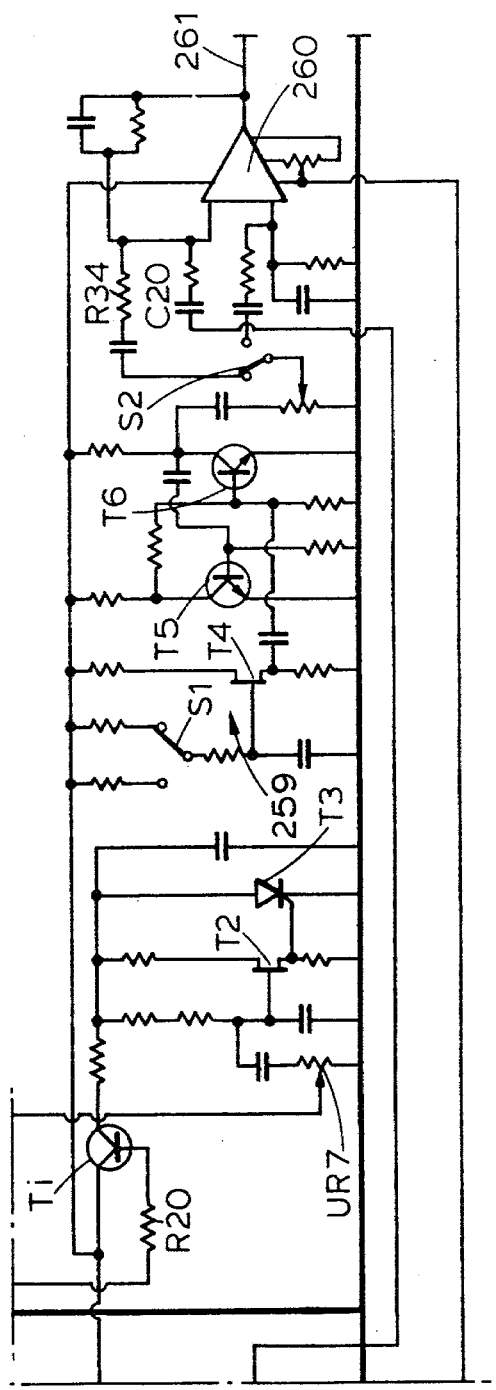

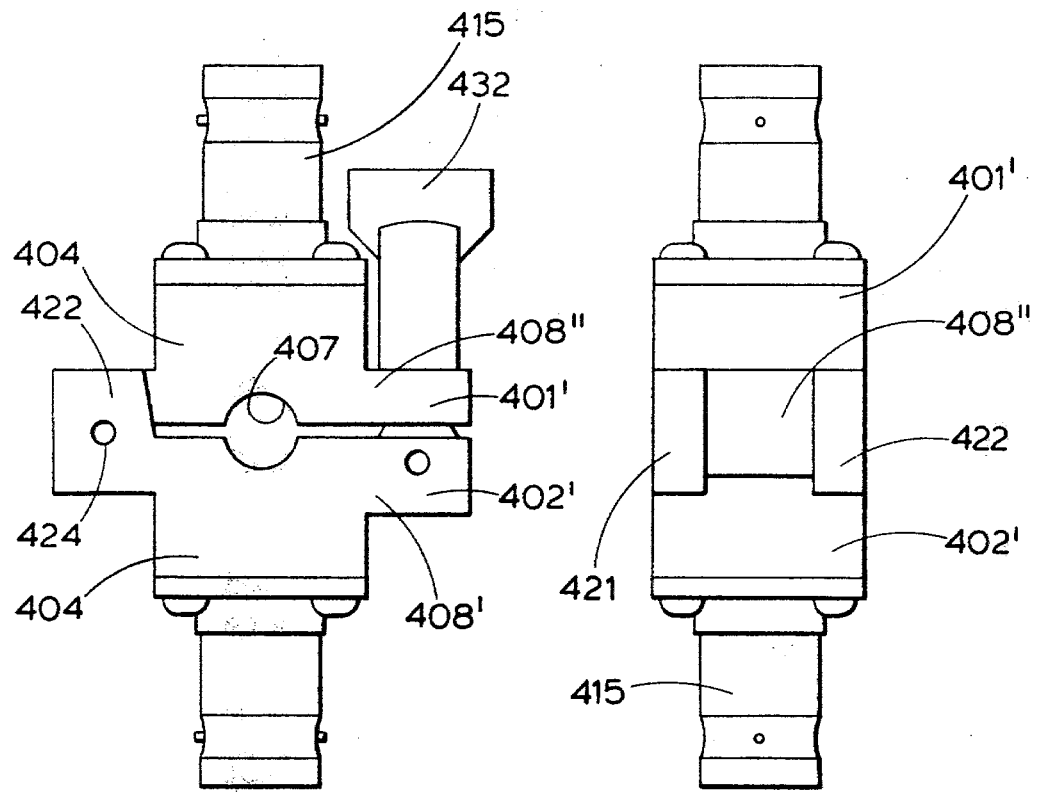
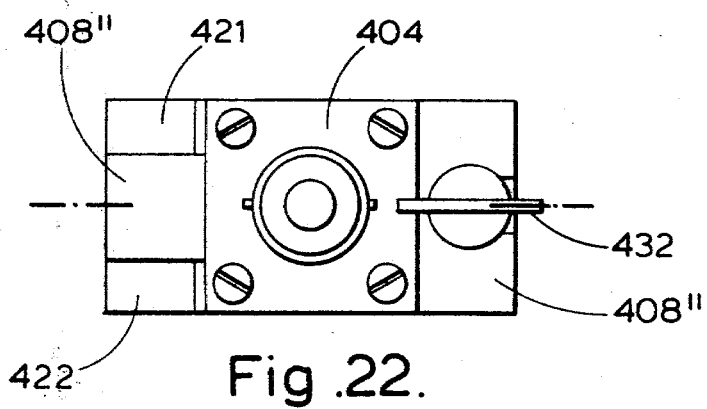

PRESSURE SENSING APPARATUS AND ENGINE ANALYZING APPARATUS

This application is a Continuation-in-Part of our Application Ser. No. 9908 filed Feb. 6, 1979 now abandoned, itself a Continuation-in-Part of our Application Ser. No. 810454 filed June 27, 1977, now U.S. Pat. No. 4,146,875.

FIELD OF THE INVENTION

This invention relates to devices for sensing pressure variations, for example cyclically varying pressure in a pipe such as a fuel line to an injector on a diesel engine. The invention relates also to engine analysing apparatus incorporating such devices.

BACKGROUND OF THE INVENTION

Fuel pressure variations in a compression ignition (diesel) engine can give important information about the running of the engine and possible adjustments and repairs. It is in the highest degree undesirable to interfere with the integrity of the fuel lines. This conditions makes it difficult to obtain suitable pressure-dependent signals for analysis.

The invention aims to provide simple and effective pressure-sensing devices suitable for a variety of engine arrangements and means to analyse signals from such devices to provide a record or display helpful to engineers investigating the performance of such engines.

However the pressure sensing devices can be adapted to various other uses, such as sensing cyclic variations in pump delivery pressure.

SUMMARY OF THE INVENTION

In one aspect the invention provides apparatus for sensing pressure of fluid in a pipe comprising: means providing similar resilient elements to be connected with respect to a fuel line whereby to be sensitive to fluid pressure changes, the resilient elements being symmetrically and oppositely disposed with regard to the directions of fluid flow, and arranged whereby to flex on pressure change, similar electrical transducer means symmetrically disposed on the resilient elements to produce electrical signals corresponding to the flexing strains on said portion.

In one embodiment of the invention the resilient elements are symmetrically opposed sections of a ring arranged to surround a pipe for the fluid, the ring having bearing elements to bear on the pipe at symmetrically arranged and spaced locations whereby dilation of the pipe distorts the ring and causes flexing of said resilient sections.

In another embodiment the resilient elements comprise a pair of similar sensing members in the form of blocks arranged to surround a pipe for the fluid, the blocks having concave faces shaped to bear on the pipe at symmetrically spaced locations whereby dilation of the pipe distorts the blocks and causes them to flex resiliently. The blocks may be secured in holders clamped around the pipe.

In a third embodiment of pair of sensing members is clamped directly around the pipe, each being shaped to bear on the pipe at symmetrically spaced locations.

In these three embodiments the apparatus may be made in separable parts so that it can be mounted around for example a fuel line in a fuel injection engine, to obtain indications of the pressure therein for testing purposes. The apparatus can then be removed after testing. There is no need to interfere with the fuel line.

In a fourth embodiment, which is a development of the second or third embodiment abovementioned, the parts of the apparatus are connected so that they can be handled as a single unit, to facilitate handling. This arrangement avoids inadvertent loss of parts in inaccessible places around an engine under test.

The first embodiment may in general be more suitable for larger engines, and it may be preferred to have the bearing elements bear on the flats of a union in the pipe.

The second and third embodiments mentioned can be more readily made in smaller sizes, which makes it suitable for use with, say, automotive diesel engines. The fourth embodiment is especially convenient where the apparatus has to be frequently connected and disconnected, for testing a succession of different engines.

In yet another embodiment of the invention the means providing the resilient elements is a thick-walled pipe section to form part of a pipe for the fluid, the pipe section having diametrally opposed symmetrical radial bores to leave thin-walled sections defining said resilient elements. In this embodiment of the invention some interference in a fuel line would be required for testing purposes: but the embodiment is intended principally for permanent assembly on an engine, to enable continuous monitoring thereof.

The invention further provides, for a fuel-injection engine having a crankshaft, pistons and cylinder means driving the crankshaft, at least one fuel injector and a fuel line thereto, engine analysing apparatus comprising: pressure sensing apparatus as defined above to be secured to the fuel line; means to produce a signal representative of a given crank angle; a display device; and signal processing means accepting signals from the transducer means and from the crank angle signal means, and controlling the display device to display fuel line pressure with respect to crank angle. For larger engines, where there is provision for access to the engine cylinders, e.g. by indicator cock, a second pressure sensing apparatus may be employed to inject into the signal processing means information as to instantaneous cylinder pressure. The second pressure sensing apparatus may be in accordance with any of the embodiments mentioned; yet another form of pressure sensing apparatus will be described below for providing cylinder pressure information.

The pressure sensing apparatus of the invention is not restricted to use with engines, but could be used in various other environments, such as to monitor cyclic pressure variations in a pump outlet.

BRIEF DESCRIPTION OF THE DRAWINGS

Embodiments of the invention will now be described by way of example, with reference to the accompanying drawings, in which:

FIGS. 9 and 10 and 10a–10c are circuit diagrams of apparatus for analysing engine performance, the apparatus incorporating both the device of FIGS. 1 to 4 and that of FIGS. 5A to 8;

FIGS. 20, 21, 22 and 23 are views similar to those of FIGS. 11 and 14 but showing a fourth embodiment of the invention, which is a modification of the third form;

DESCRIPTION OF PREFERRED EMBODIMENTS

Figure 1:
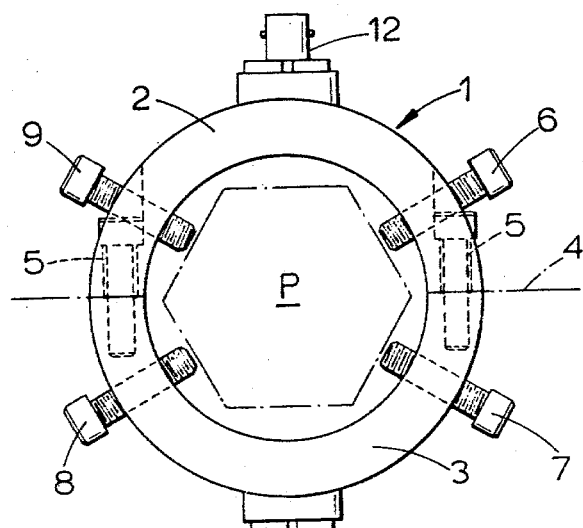
FIG. 1 is an end view of a first form of device for sensing pressure in a fuel line, the device being shown mounted on a pipe union.

Referring to the drawings, the first form of fuel line pressure sensing device to be described is illustrated in FIG. 1 to 4. The device comprises a ring 1 made in two halves 2, 3 mating on a diametral plane 4 and secured together by bolts 5. The ring 1 is shown assembled about a pipe union P in a fuel line. Four pairs of screws 6,6,7,7,8,8,9,9, threadedly engage the ring and are tightened to engage flats on the union. The centre lines of screws 6,7 on the one side, and of the screws 8,9 on the other, define 60° angles which are bisected by the plane 4.

Identical transducers 10 are mounted symmetrically one in each half of the ring. Each transducer 10 is a ceramic piezoelectric crystal element in the form of a disc and is cemented to the flat bottom of a bore 11 in the respective half of the ring, the bores being aligned on an axis perpendicular to the place 4. A connector 12 is threaded into each bore and connected to a lead 13 from the respective crystal unit.

It will be seen that the two halves 2, 3 of the ring are thus each a mirror image of the other, about the plane 4, and that each half is also symmetrical about the dimetral plane perpendicular to the plane 4.

As the pressure line union P dilates and contracts due to pressure variations, the two halves 2, 3 of the ring flex symmetrically in the manner of bending beams, and this movement is sensed by the transducers 10 which give corresponding electrical signals. The transducers are connected so that unwanted components of the signals tend to cancel out and the pressure dependent components to reinforce one another. The pressure dependent signals can be displayed on an oscillograph, and recorded photographically if desired. Apparatus for doing this is described later. It will be appreciated that the fuel pressure variations provide a valuable indication of the function of the injector which the fuel line supplies, and also, in conjunction with crank angle information, of the timing of the fuel injection.

However, the device of FIGS. 1 to 4 can also be used for high pressure lines of various kinds; the arrangement of screws 6,6, 7,7, 8,8, 9,9, can be adapted to suit whatever exterior shape the device has to be clamped on.

The piezoelectric elements can be replaced by impedance strain gauges.

FIGS. 5A to 8 illustrate a device for sensing pressure of an engine cylinder.

The device of FIGS. 5A to 8 comprises a cylindrical block shown generally at 100 which is formed with an axial bore closed at its upper end and providing a pressure chamber 102. A thick-walled tube 103 is threadedly engaged in a counterbore 104 and provides communication between the chamber 102 and an engine cylinder. The block 100 is formed with symmetrical through passages 105 which are generally segmental as seen in plan. By reason of these passages 105 the block 100 can be regarded as defining a central member or pressure vessel 106 containing the chamber, a ring 107 coaxial therewith, and elements 108 connecting the central member to the ring, these elements being aligned on a diameter D. Pressure in the chamber 102 causes expansion of the central member 106 which is transmitted to the ring 107 to cause flexing of the two portions 109 thereof which are symmetrical about the diameter D.

An electrical transducer 111 in the form of a disc-like piezoelectric crystal element is cemented to the flat bottom of a bore 112 in each of the ring portions 109, the bore 112 being similar and aligned on a diameter perpendicular to the diameter D. Each transducer 111 is connected to a connector 113 (shown in FIGS. 5A, 5B and 6 but not in FIG. 8).

As the central member 106 dilates and contracts due to variations in pressure within the chamber 102, the two portions 109 of the ring 107 flex symmetrically in the manner of bending beams, and this movement is sensed by the transducers 111 which give corresponding electrical signals. The transducers are connected so that unwanted components of the signals tend to cancel out and the pressure dependent components to reinforce one another. The pressure dependent signals can be displayed on an oscillograph, and recorded if desired. Apparatus for this will be described below.

A recess 115 is formed in the upper end of the block 100, and upper and lower ends are covered by plates 116, 117. An air inlet is provided at 118 to admit cooling air to one of the segmental passages 105 near the bottom plate 117. Cooling air passes up this passage, across the recess 115 and down the other passage, to air exit holes 119. Thus in spite of high temperatures within the chamber 102, the ring portions 109 can be kept at a low enough temperature to avoid damage to the transducers. The device can be connected to an engine cylinder with very little connecting volume, so that the pressure in the chamber can follow accurately that in the cylinder.

The device can be used for measurement of high and fluctuating pressures from sources other than engine cylinders.

The cylinder pressure sensing device just described may with advantage be combined with the device for sensing fuel pressure described with reference to FIGS. 1 to 4, in engine performance analysing apparatus illustrated in FIGS. 9 and 10.

Figure 9:
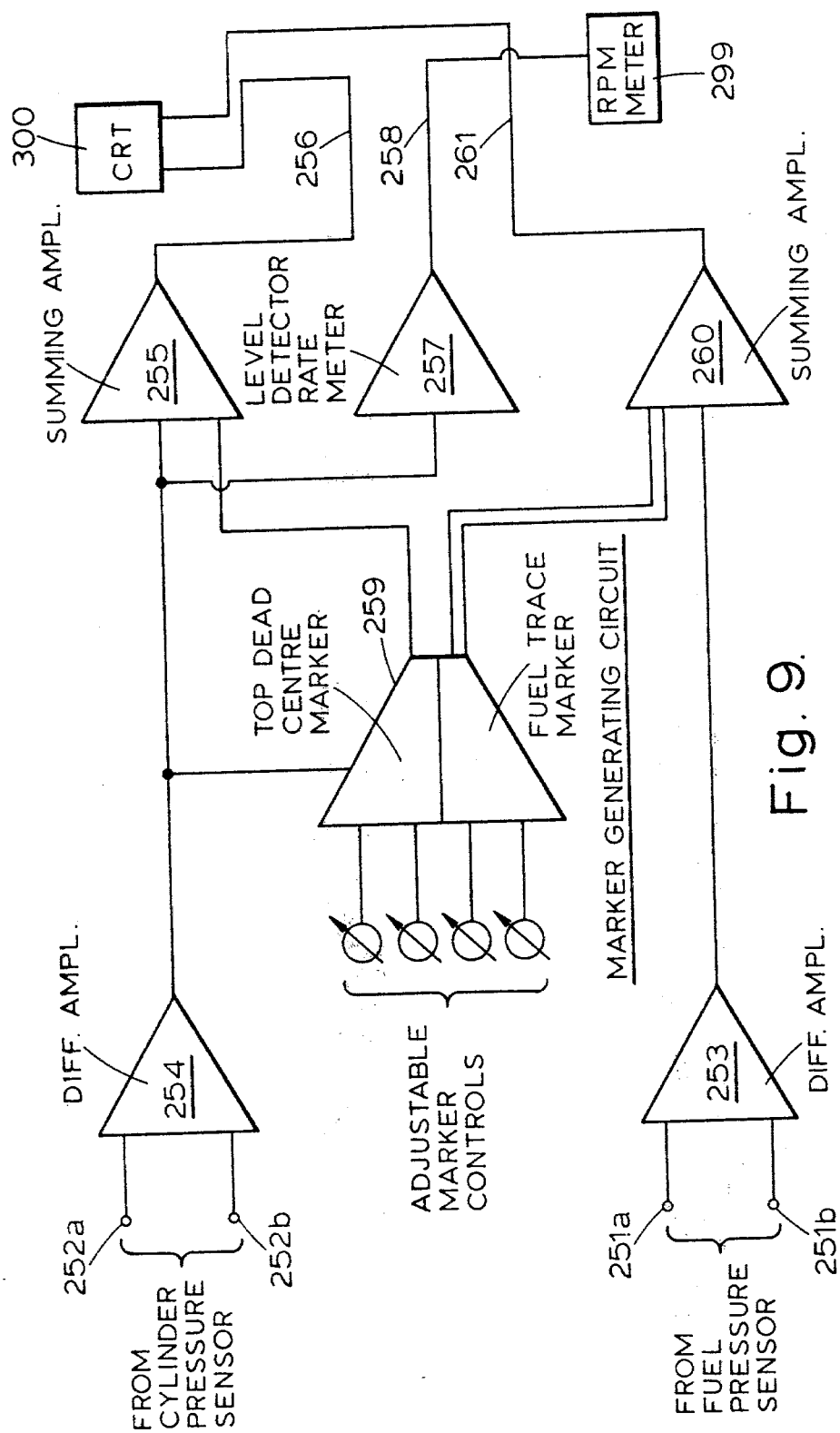
Figure 10A:
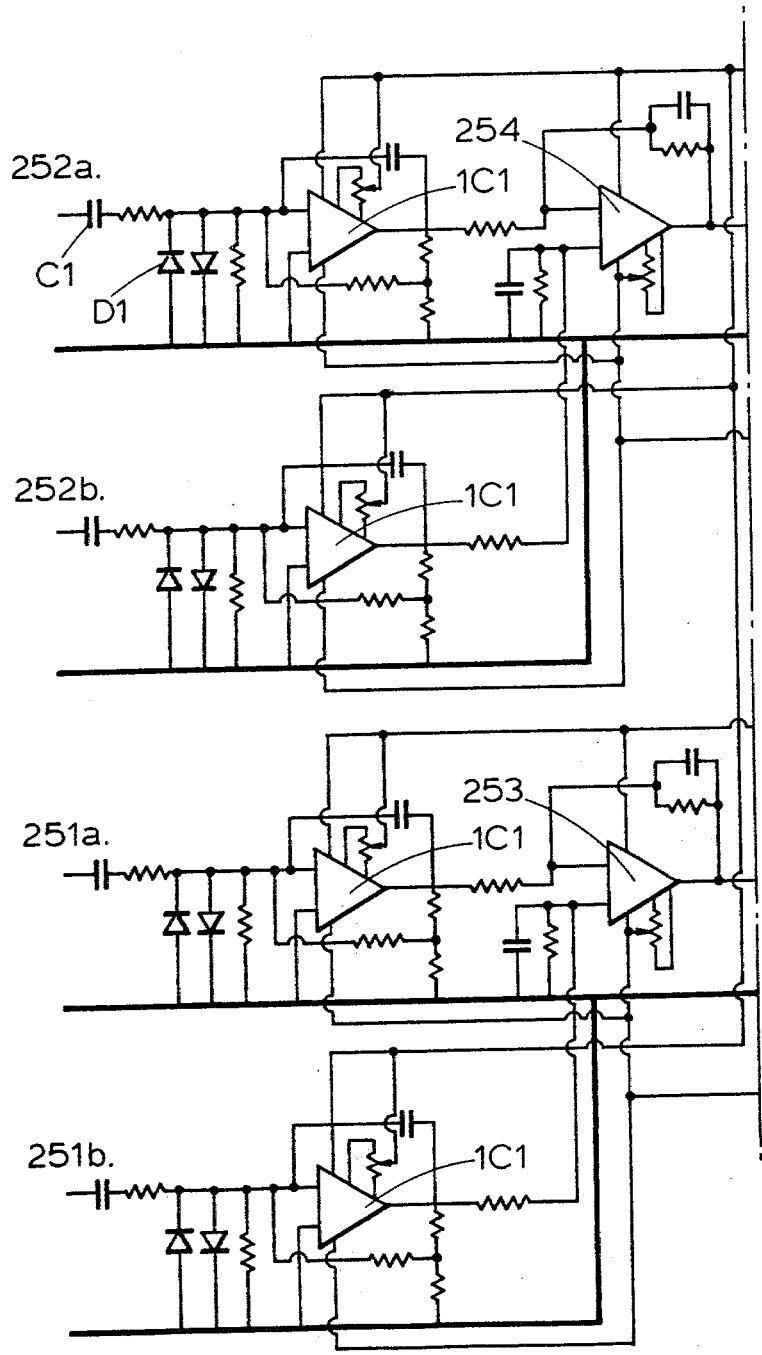
Figure 10B:
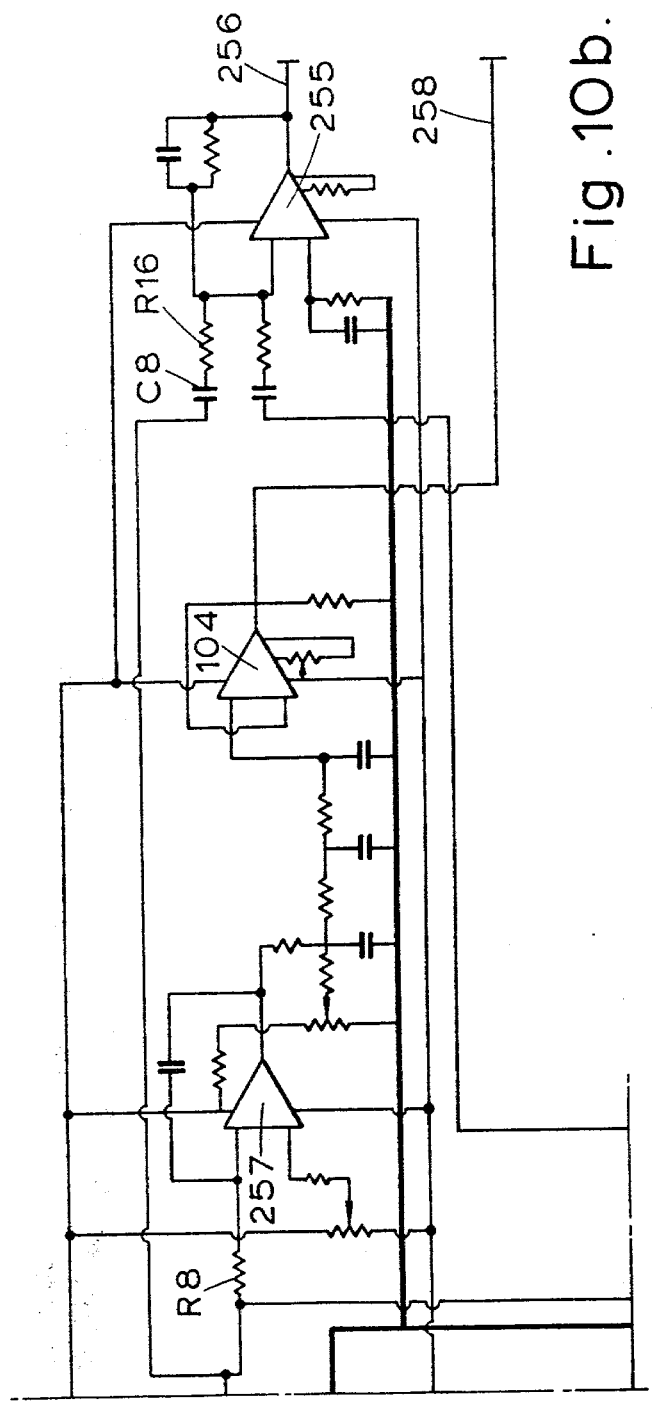
Figure 11:
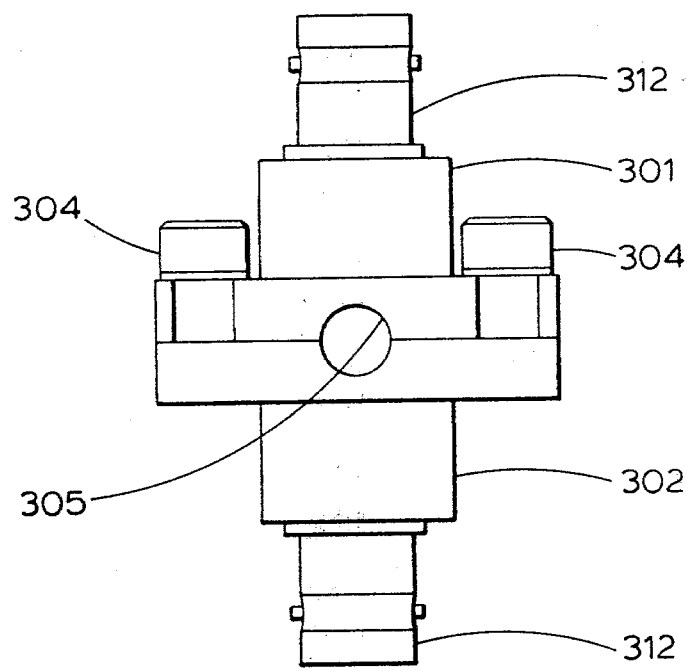
FIGS. 11 and 12 are respective end and side views of a second form of apparatus in accordance with the invention for sensing pressure variations in a fuel line.
Figure 12:
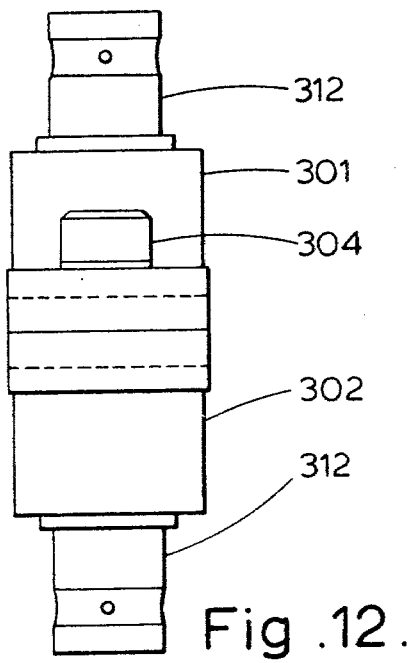
Figure 13:
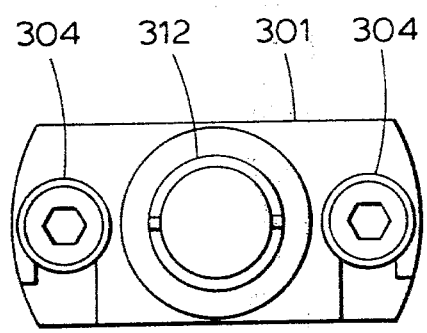
FIGS. 13 and 14 are respectively a plan view and a transverse section of the second form of apparatus.

The analysing circuit is shown diagrammatically in FIG. 9 and in more detail in FIG. 10. High impedance input from the crystals of the fuel pressure sensing device and the cylinder pressure sensing device are shown at 251a, 251b, and 252a, 252b respectively. As seen in FIG. 9, each pair of inputs is fed to a differential amplifier 253, 254 respectively wherein noise signals, being 180° out of phase, are cancelled out and pulses due to fuel or cylinder pressure are reinforced. As will appear from FIG. 10, each input is fed through an amplifier 1C 1 which can be a field effect transistor input silicon monolithic integrated circuit (FET-1C). The components C1, R1, D1, serve to protect the amplifier 1C 1, during plug-in, from any high voltage that may have built up in the respective transducer.

At the output of the cylinder pressure differential amplifier 254 the signal divides. One path (via C8 and R16 in FIG. 10) feeds the summing amplifier 255 which drives the upper channel 256 of a duel channel cathode ray oscilloscope 300. Another path from amplifier 254 (via R8 in FIG. 10) feeds a squaring circuit 257 to produce a pulse train.

The level detector 257 (through buffer amplifier 1C4 in FIG. 10) provides an analogue pulse train signal for a digital R.P.M. meter 299 for which a connection is shown at 258. The output from the amplifier 254 is also connected (through transistor switch Ti, FIG. 10) to one section of a marker generator circuit 259 which will be seen from FIG. 10 to comprise a unijunction transistor (UJT) T2 and silicon controlled rectifier T3.

A timed pulse is fed via UR7 to the cylinder pressure summing amplifier 255. This pulse is used as a top dead centre marker.

The output of the fuel pressure differential amplifier 253 is fed straight to a fuel summing amplifier 260 (via C20 and R34, FIG. 10). Timed marker pulses are also fed to this summing amplifier 260 from a second section of marker circuit 259 in order that measurements may be taken on photographs of the traces. For accuracy two timed markers are available, depending on the position of timer switch S1, that required being selected by ganged switch 51,52 and being generated by the U.J.T. T4 and shaped by T5 and T6 (FIG. 10). So that confusion does not arise over which timed markers are in use, those intended for high speed operation are inverted by connecting them to the inverting input of amplifiers 260 by suitably positioning the connector switch 52. The output of the summing amplifier 260 is taken to the second or lower channel 261 of the dual channel oscilloscope.

It will be noted that FIG. 10 for convenience is shown in three parts 10a, 10b, 10c which fit together as shown in the diagram above FIG. 10c.

An important feature of the pressure sensing means herein described is the arrangement of the ring so that portions bend in the manner of a bending beam. This provides for considerable flexibility in design, as given an expected pressure range a desired strain for a particular piezoelectric crystal can readily be obtained by appropriate dimensioning of the parts.

Figure 2:
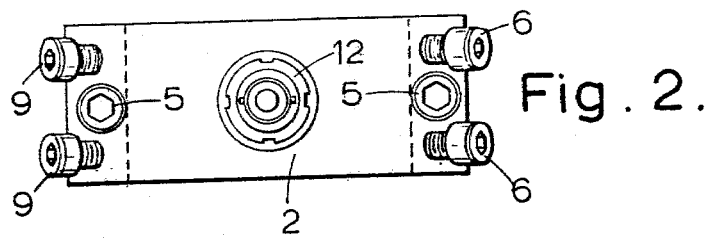
FIGS. 2 and 3 are side elevations of the FIG. 1 device from directions at right angles to one another.
Figure 3:
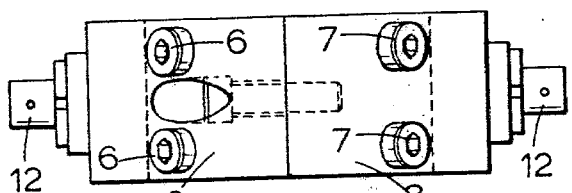
Figure 4:
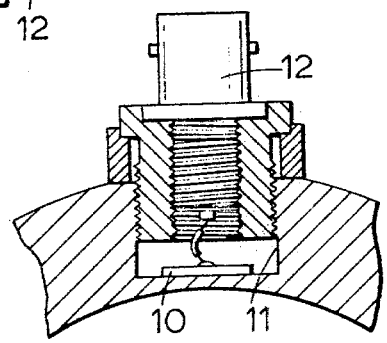
FIG. 4 is an enlarged sectional view showing a transducer mounted in the device.
Figures 5A, 5B:
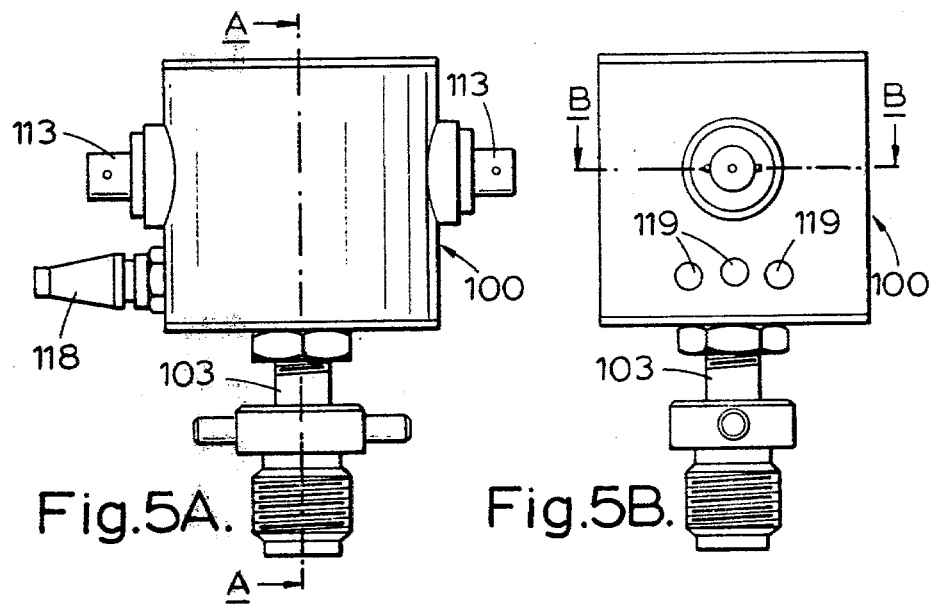
FIGS. 5A and 5B are side elevations, seen at right-angles to one another, of a cylinder pressure sensing device.
Figures 6, 7, 8:
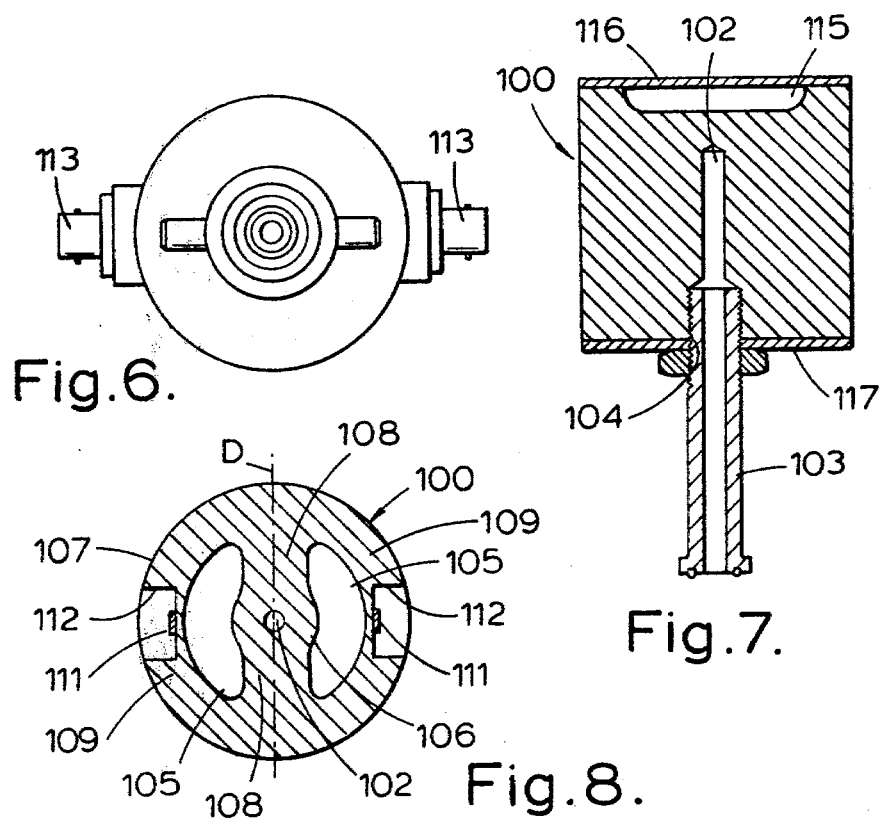
FIG. 6 is a bottom plan view of the device of FIGS. 5A and 5B.
FIGS. 7 and 8 are sectional views of the device taken respectively on the lines A—A and B—B shown in FIGS. 5A and 5B.

Referring now to FIGS. 11 to 15 of the drawings, the second form of pressure sensing apparatus there shown comprises a pair of similar rigid metallic holders designated generally 301, 302 which in use of the apparatus are clamped around a fuel pipe 303 (shown in FIG. 15A) by means of a pair of screws 304. The holders define a central cylindrical aperture 305, as shown in FIGS. 1 and 2, and the fuel line extends through this.

Figure 14:
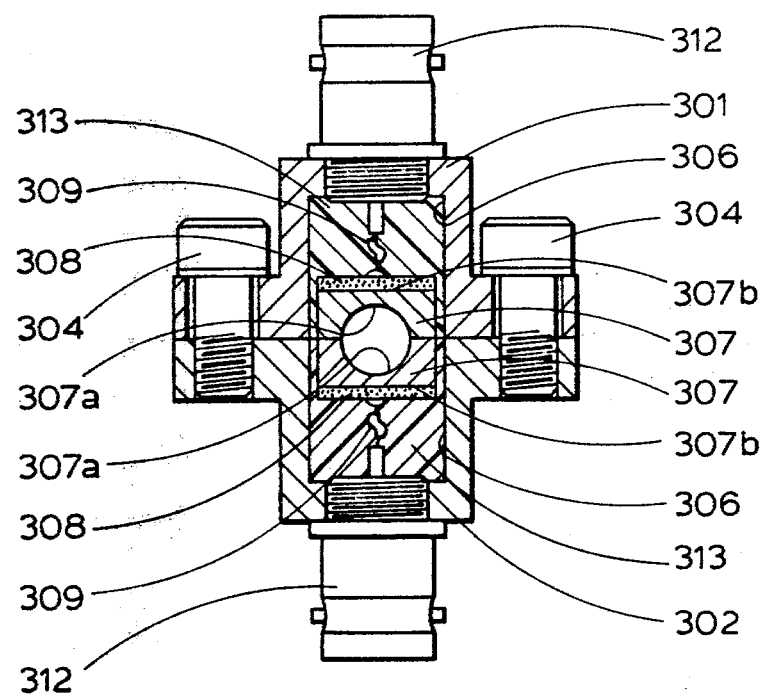

Referring now to FIG. 14, the holders, 301,302 seen in transverse section each define a generally cylindrical cavity or space 306. The cavities 306 of the two holders are aligned with their common axis at right angles to the axis of the fuel lines. A metallic block 307 adapted to bear on the fuel line 303 is located coaxially in each cavity 306, with clearance at the bottom and sides of the cavity. The blocks 307 are each cylindrical, with their axes aligned on that of the cavities 306. One face 307a of the block 307 is generally concave and bears on the fuel line as will be described. A piezo-electric transducer element 308 extends over the whole circular area of the other face 307b of the block and is cemented thereto in electrical contact therewith. A connecting wire 309 is taken from the free face of the transducer element 308 to a terminal on a bayonet connector 312 mounted on the holder. It will be seen that the clearance between the block 307 and the piezo-electric element 308, and the bottom of the cavity 306, is of the same order as the depth of the block and element. The clearance between the sides of the block and the side walls of the cavity is much less.

The block 307 is conveniently of the aluminium alloy available under the designation DURAL HE 30TF as defined in British Standard Specification 1470. This alloy combines freedom from corrosion and easy machining with a modulus of elasticity which for a metal is fairly low. Alternatively the block could be made of brass.

The holders 301, 302 can be made of the same aluminium alloy, though for the holder the choice of material is less critical.

The cavity 306 around the block 307 is filled with thermosetting epoxy resin 313, for example Araldite AV 8. This material is, for a plastics material, relatively hard and elastic; but its hardness and modulus of elasticity are much less than that of the alloy of the blocks 307.

When the holders 301, 302 are secured together about a pipe 303 the holders and the blocks 307 are very slightly spaced apart so that the blocks bear on the pipe.

Figure 15A:
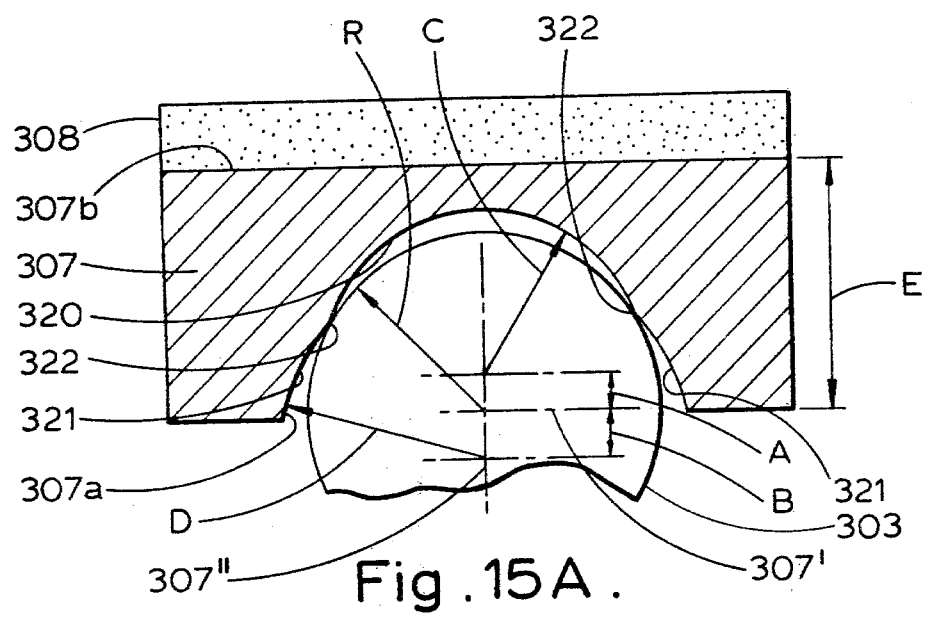
FIG. 15A is an enlarged view of a block forming part of the second form of apparatus shown assembled on a fuel line.

Each block 307 has its concave face 307a formed on two radii one, shown at C, less than the pipe outside radius R and the other, D, greater than this, as shown in FIG. 15A. The blocks 307 make virtual contact on a diametual plane 307' of the pipe; this is also part of the envelope surface of the block. The smaller radius C is centered within the envelope surface 307' by a distance A. The larger radius D is centered outside the envelope 307' by a distance B. Both the centres of radii C and D and the centre of the pipe lie on the vertical centre line 307'' of the block so as to give a symmetrical arrangement. Each block 307 embraces some 180° of the pipe. The arcs 320 and 321, 321 formed on the radii C and D respectively intersect to form cusps 322, 322 at 30° and 150°. It is at these points 322, 322 that the block 307 bears upon the pipe.

In one construction according to the invention each cavity 306 is 12 mm in diameter and 12 mm deep, and each block 307 is 10 mm in diameter. With this construction, the preferred dimensions for various pipe diameters are as follows:

| Fuel Pipe Size | 6 | 8 | 10 |
| --- | --- | --- | --- |
| Dimension 'A' | 0.6 | 0.8 | 1.06 |
| Dimension 'B' | 0.8 | 1.06 | 1.33 |
| Dimension 'C' | 2.75 | 3.6 | 4.66 |
| Dimension 'D' | 3.5 | 4.66 | 5.8 |

| -continued | | | |
|---|---|---|---|
| Fuel Pipe Size | 6 | 8 | 10 |
| Depth E of block | 4 | 5 | 6 |

(all dimensions in millimeters)

The radius D is the less critical of the two, C and D. While it is considered best to have the block bear at the points 30° and 150°, some variation is permissible; more especially the points 322 could be moved outwards towards the ends of the 180° arc of embrace.

When fuel is supplied through the pipe 303 to an injector the pulse of pressure dilates the pipe. This in turn applies a force at the points 322 of the two blocks 307. Each block deforms elastically and the deformation is sensed by the piezo-electric crystal 308. Each crystal produces an electrical signal dependent on the deformation applied to it. The signals, by symmetry, are equal and opposite.

Each block 307 acts as a bending arch supported at the points 322 and uniformly loaded on top. The deformation of the blocks 307 on dilatation of the pipe 303 is illustrated in an exaggerated manner in FIGS. 15B and 15C. The shape of the block can be designed for optimum response. For example, the section at the top of the arch can be reduced. The block need not have a flat top, but can be symmetrically sloped or rounded.

If desired each block 307 can be supported by plastics material at its sides only, and not at the bottom of the cavity. The plastics material applies shear forces to the sides of the block and the loading of the arch is therefore different. Alternatively the block 307 could be supported by plastics material at the bottom of the cavity, not at the sides. The arrangement illustrated is, however, easy to make and robust.

The apparatus can readily be bolted on or removed from a fuel line of a small compact engine. It can be secured to each of the fuel lines of an engine in turn.

Appropriate bridge circuits allow the signals from the two crystals 308 to be reinforced and the noise attenuated. The signals can be displayed as a C.R.T. in relation to engine crank angle. Circuitry for this purpose is illustrated in FIGS. 9 and 10 above.

In small production engines, such as for automotive use, there is normally no means of access to cylinder pressure, and with such engines, in the circuit arrangement of FIGS. 9 and 10 the inputs 252a and 252b are not used. The circuit can accordingly be simplified.

While the pressure sensing device of FIGS. 11 to 15C has been designed principally for smaller engines, since it can more readily be made in small sizes than the first form of apparatus described, it could also be made in sizes for use on larger engines. The table above gives certain dimensions appropriate to such engines. The present tendency with larger engines however is to encase the fuel lines as a precaution against leakage or breakage. With such fuel lines the first form of apparatus is more suitable since it can more readily be mounted on a union nut.

The device of FIGS. 11 to 15C can be used with an engine cylinder pressure sensing device, if the engine cylinder pressure is accessible, as it is on larger or experimentally adapted engines. In such case the cylinder pressure can be obtained by the method previously described, and the pressure-dependent signals injected into the analysing circuit at 252a and 252b.

However, cylinder pressure can also be monitored by connecting a closed tube to the cylinder, e.g. to the indicator cock where provided: a pressure sensing device according to any one of the embodiments can then be mounted on the closed tube. Particularly for larger engines it may be desired to have pressure sensing apparatus permanently connected, so that the engine cylinder performance can be monitored continuously, or sampled, for example at the engine control console. The apparatus to be described with reference to FIGS. 24 to 27 is useful for this purpose. It can be mounted at the exit of an injector pump clear of any fuel pressure line sheathing.

Referring now to FIGS. 16 to 19 of the drawings, the apparatus there shown comprises a pair of sensing members 401, 402 to be secured together about a pipe (not shown) by screws 403. Each sensing member 401, 402 comprises a body 404 which has a square outline in plan and a cylindrical recess 405. The base 406 of each body is recessed at 407 to receive a pipe (not shown). Each body 404 has integral lateral-extending flanges 408. The screws 403 engage threaded holes in the flanges 408 of the sensing member 402. The flanges 408 of the body 401 although not illustrated, can as shown in the previous embodiment define apertures which are open to the side, so that the sensing member 401 can be slid into position on the member 402 and secured thereto by the screws 403, without the screws having to be removed from their threaded holes in the member 402.

Matched piezoelectric crystal 412 are cemented to the flat bottom of the recess 405 in the body 404 to sense elastic movement of the base 406 of that body. Each crystal 412 is a disc which fits into the recess with clearance and is connected by a wire 414 to the connector 415 secured to a plate 416 fixed to the top of the body 404. The space within the recess is filled up with silicone rubber as shown at 417.

Figure 15B:
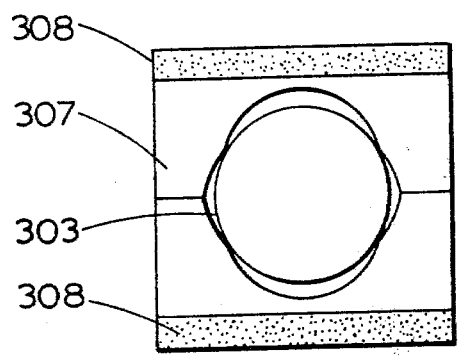
FIGS. 15B and 15C are diagrammatic sections of the blocks, with crystals thereon, showing, in an exaggerated manner, deformation on dilation of the pipe.
Figure 15C:
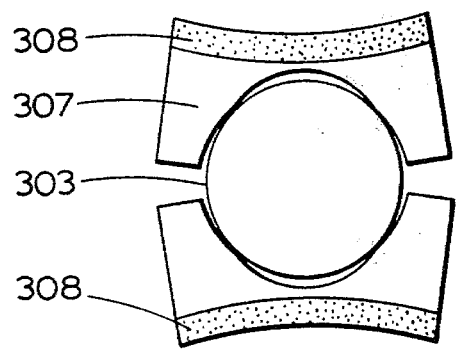
Figure 16:
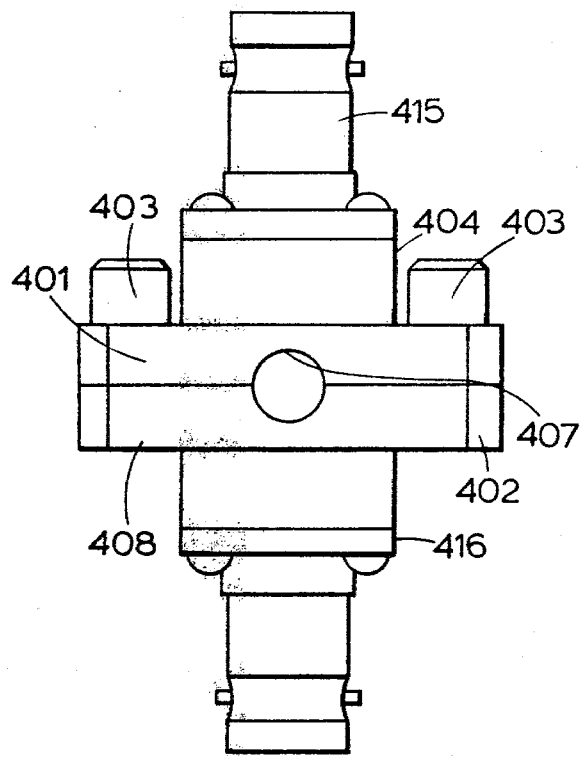
FIGS. 16, 17, 18 and 19 are views similar to those of FIGS. 11 and 14 but showing a third form of apparatus according to the invention.
Figure 17:
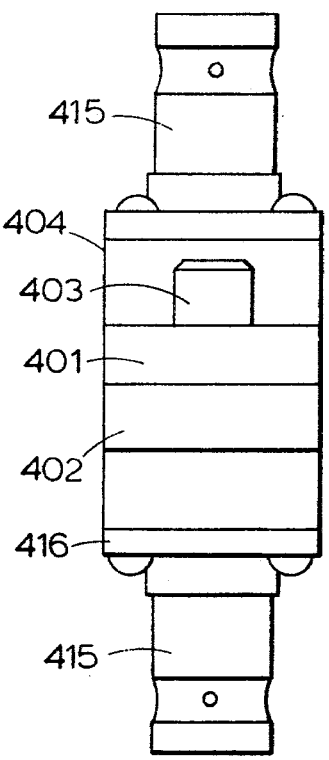
Figure 18:
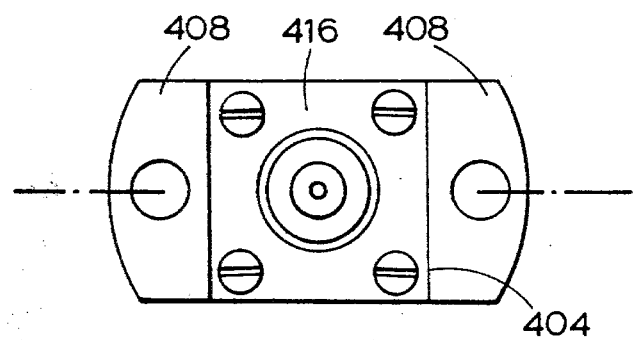

The recess 407 in the base of each body is formed on two radii as described with reference to FIGS. 15A, 15B and 15C above so that each base rests upon the pipe at two spaced points, at 30° and 150°. The block described with reference to FIGS. 15A, 15B and 15C above is disc-like in plan and it will be appreciated that in the apparatus here illustrated each base 406 bears upon the pipe over the whole axial length of the sensing member.

Figure 19:
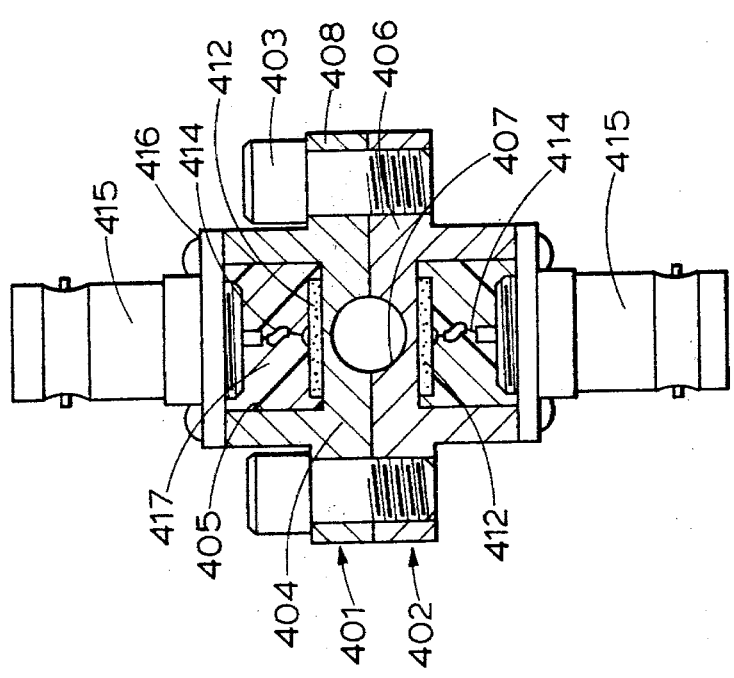
Figure 24:
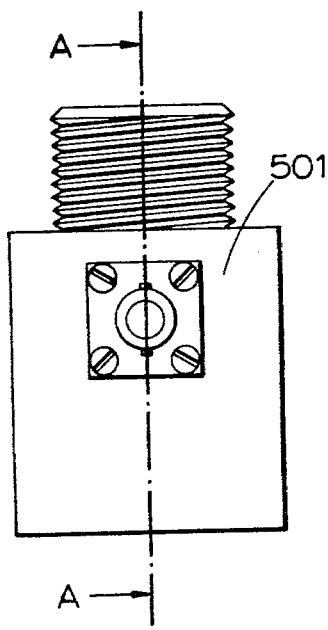
FIG. 24 is a side view of a section of pipe which forms part of a third form of apparatus according to the invention.
Figure 25:
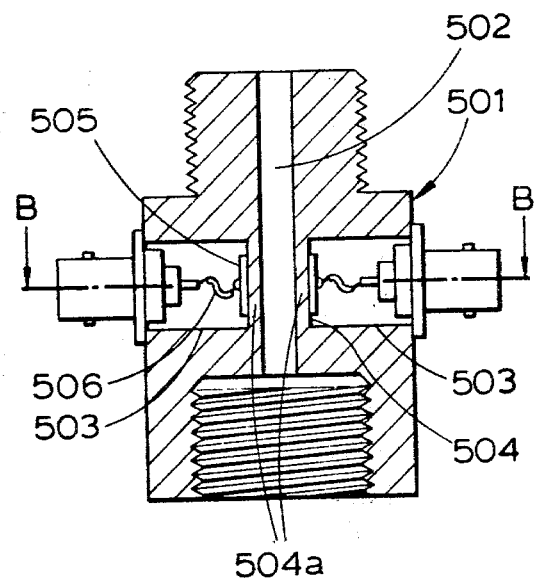
FIG. 25 is a section on the line A—A in FIG. 24.
Figure 26:
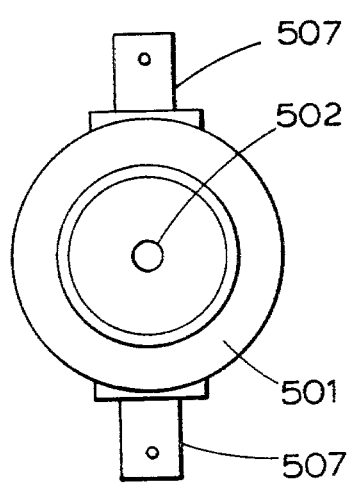
FIG. 26 is a top view of the third form of apparatus.
Figure 27:
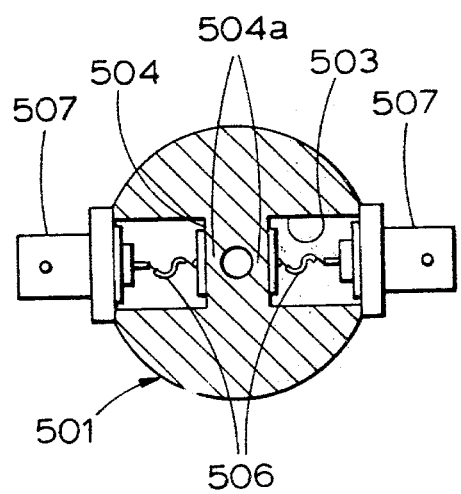
FIG. 27 is a section on the line B—B in FIG. 26.

The central part of the base 406 moves elastically as the pipe dilates, but this movement is somewhat different from that of the previous embodiment. As seen in the section of FIG. 19, the deforming part of the base 406, which in some respects corresponds to the block 307 of the embodiment previously described (FIGS. 11 to 15C), can be regarded as an encastred beam. However, the deforming part of the base 406 is generally circular so that in some respects it can be regarded as a diaphragm, that is, encastred over an arc of 360°.

The manner in which the deforming part of each sensing member base 406 is mounted will tend to reduce the signal from the transducer as compared with that of the previous embodiment, other things being equal. However, the apparatus according to this present embodiment is easier to make than that of the previous embodiment, and it is possible to reduce the section of the base at the 90° angle, so as to render it more flexible. This in turn helps to increase the signal from the transducer.

It is easier to obtain matched pairs of sensing members with the present embodiment than with that of FIGS. 11 to 15C, possibly due to the fact that in the latter construction the ultimate positioning of the blocks depends on the encapsulation. The present embodiment minimizes a resonance problem that affects transducers of the earlier embodiment, where one block may occasionally act as a tuning fork.

The reader is referred to the earlier FIGS. 11 to 15C and accompanying text above for description of common features.

Referring now to FIGS. 20 to 23 of the drawings, the apparatus there illustrated is generally similar to that of FIGS. 9 to 19 except for the way in which the sensing members are held together. Similar parts are designated by the same reference numerals and will need no further description. In brief, sensing members 401', 402' in FIGS. 20 to 23 are hinged together at one side of the pipe and secured together at the other by means of an eye bolt itself hinged to one of the members, so that the two members and the fastening means therefor form a single unit of which the parts are hingedly connected to facilitate the use of the apparatus in service. The arrangement described avoids the loss of small parts such as screws.

Figure 23:
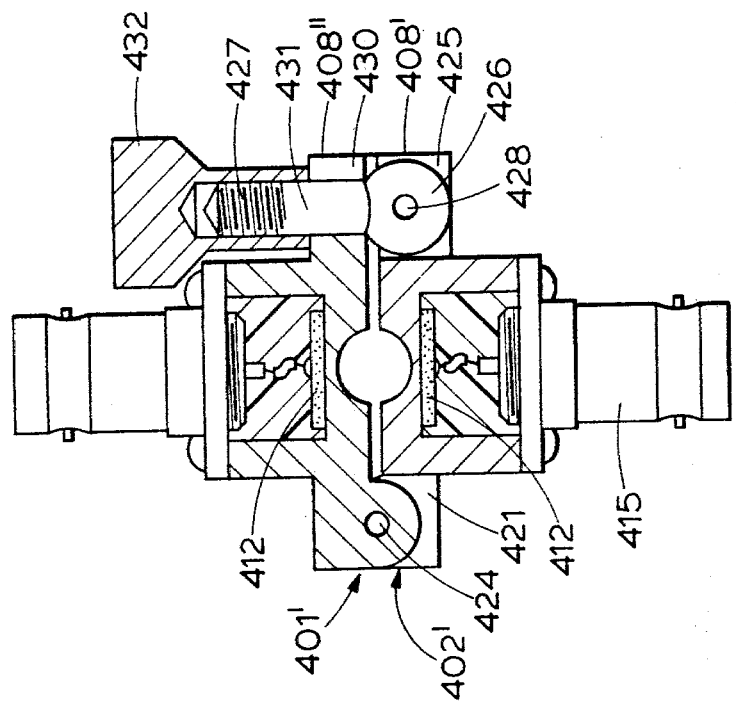

Referring now in more detail to FIGS. 20 to 23, the sensing member 402' has a pair of lugs 421, 422 upstanding from its flange 408' at the left-hand side as seen in FIGS. 20, 22 and 23. The flange is cut back inbetween these lugs. Sensing member 401' has its flange 408" at the left-hand side as shown in the figures, cut back to fit snugly between the lugs and extended to carry the hinge pin 424 which extends also throug the lugs 421, 422 on the sensing member 402'.

The sensing member 402' has its flange 408' at the right-hand side, as seen in FIGS. 20, 22 and 23, centrally slotted at 425 to accommodate the disc-like eye 426 of the eye bolt 427. A hinge pin 428 extends through the eye 426 and into the flange 408' on either side of the slot 425.

The flange 408" of the sensing member 401' on the right-hand side as shown in FIG. 20, 22 and 23, is centrally slotted as shown at 430 to accommodate the shank 431 of the eye bolt 427. This shank receives a wing nut 432 to apply pressure to the flange 408".

The sensing members 401', 402' are formed so that when assembled around a pipe they do not quite touch one another.

The pressure sensing apparatus of FIGS. 20 to 23 is shown as if assembled around the pipe. Clamping pressure is applied by the hinge on the left-hand side, as seen, and by the eye bolt on the right-hand side. The sensing members contact the pipe and operate exactly as described with reference to FIGS. 16 to 19. To disconnect the apparatus from the pipe it suffices simply to unscrew the wing nut 432, to swing the eye bolt 427, with the wing nut attached, outwardly of the slot 430 in the sensing member 401', and move the members about the hinge 424 so as to release them from the pipe. It is to be appreciated that the whole apparatus can be handled as a single unit in assembly and disassembly around the pipe.

There are various alternative ways of arranging for the apparatus to be handled as a single unit. For example the eye bolt could be replaced by a toggle mechanism which would have the advantage of providing a fixed pressure on the pipe. The sensing members could be connected simply by some part which performs no function in applying pressure to the pipe, for example a light flexible plastics connector: pressure to the pipe could then be applied by a pair of wing nuts one on each side or a pair of toggle mechanisms or some other fastening means which would form a unit with the sensing members.

It has been found advantageous to have the weights of the sensing members about equal on both sides.

Referring to FIGS. 24 to 27, the pressure sensing apparatus there shown comprises a section of thick wall pipe 501 with a central bore 502. Two cylindrical cavities 503 are formed in the wall of the pipe 501: they are aligned on a diameter and have flat bottoms 504. The cavities 503 define relatively thin wall portions 504a. A piezoelectric transducer element 505 is cemented to the flat bottom 504 of each of the cavities 503. A connecting wire 506 is taken from the transducer element 505 to a terminal on a bayonet connector 507 mounted on the pipe above the cavity.

When fuel is supplied through the pipe the pulse of pressure causes the thin wall portions 504a of the cavities 503 to deform in the manner of diaphragms, i.e. resilient discs encastened at their edge portions.

An electrical signal dependent on this strain is produced by the piezoelectric transducers 505.

The signals from the transducers 505 may be taken to engine analysing apparatus as described with reference to FIGS. 9 and 10 above. If it is desired to have traces on the display relating only to fuel pressure, then the terminals 252a and 252b will not be used. However, cylinder pressure information can be made available, at least with larger engines where the cylinders have indicator plugs. As described above, cylinder pressure can be obtained by the apparatus described with reference to FIGS. 5 to 8. Alternatively, a closed-end tube can be connected to the engine cylinder and pressure sensing apparatus attached to this tube, the signals from the transducers thereof being taken to the connections 252a, 252b of FIG. 9. The pressure sensing apparatus can be according to FIGS. 1 to 4, or to FIGS. 11 to 15C, or to FIGS. 16 to 19 or alternatively the apparatus just described with reference to FIGS. 20 to 23 could be adapted for the purpose.

Where in the above reference has been made to cementing of the piezoelectric crystal, it is to be understood that this cementing is done preferably under pressure using an epoxy adhesive, with the silvered side of the transducer towards the metal. It is found that electrical contact can be made satisfactorily in this way. A silver-loaded adhesive can be used but will not normally be necessary. With the crystal secured as described no second wire is required to the connectors.

We claim:

1. Apparatus for sensing fluid pressure in a pipe comprising:
   a pair of similar pipe contacting means arranged on assembly to surround the pipe, with each said means making contact with the pipe at symmetrically spaced locations;
   means to hold the pipe contacting means releasably in assembled variation about the pipe and in contact therewith;
   said pipe contacting means defining between symmetrically disposed adjacent pairs of said spaced locations a pair of beam portions which are similar and symmetrically arranged on opposite sides of the pipe;
   said beam portions being subject to equal and opposite bending strains on dilatation of the pipe on change of pressure within it; and
   similar electrical transducer means symmetrically disposed on the beam portions to produce electrical signals corresponding to the strain therein, the signals being equal and opposite at any instant.

2. Apparatus as claimed in claim 1, wherein the pair of pipe contacting means together on assembly embrace substantially a 360° arc of the pipe, one said means embracing 0° to 180° and the other 180° to 360°, and said means making contact with the pipe substantially at angles 30° and 150° for one said means and 210° and 330° for the other, the beam portions including those parts of the respective means between substantially 30° and 150° for the one means and 210° and 330° for the other means.

3. Apparatus as claimed in claim 2, wherein each transducer means is a piezo-electric crystal and said crystals are cemented to areas of the respective beam portions which are symmetrical about the 90°–270° diameter.

4. Apparatus as claimed in claim 2, wherein the means to hold the pipe contacting means releasably in assembled relation comprise a pair of threaded means.

5. Apparatus as claimed in claim 1, wherein the pipe contacting means comprise a pair of semicircular ring members having radially directed threaded elements to bear on the pipe at said spaced locations, the means to hold the pipe contacting means in assembled relation including releasable connector means connecting the ends of the ring members together in a ring about the pipe.

6. Apparatus as claimed in claim 5, wherein the ring members embrace respectively 0–180° and 180° to 360° of the pipe and have said threaded element disposed at 30° and 150°, and at 210° and 330°, respectively.

7. Apparatus as claimed in claim 6, wherein the transducer means are piezo-electric crystals located in similar holes formed in the ring members at 90° and 270° respectively.

8. Apparatus as claimed in claim 1, wherein the pipe contacting means comprise a pair of blocks having concave faces formed to bear on the pipe at said spaced locations, and the means to hold the pipe contacting means releasably in assembled relation about the pipe comprise similar rigid holders one mounting each block and releasable clamping means to secure the holders together about the pipe.

9. Apparatus as claimed in claim 8, wherein the blocks are mounted in cavities in the holders and surrounded by resin to secure them in position therein, the resin being of substantially lower modulus of elasticity than the material of the blocks.

10. Apparatus as claimed in claim 8, wherein the blocks embrace respectively 0° to 180° and 180° to 360° of the pipe and are formed to have lines of contact with the pipe at 30° and 150°, and at 210° and 330°, respectively.

11. Apparatus as claimed in claim 8, wherein the transducer means are piezo-electric crystals, each crystal being secured over that face of the respective block which is directed away from the pipe.

12. For a fuel-injection engine having a crankshaft, pistons and cylinder means driving the crankshaft, at least one fuel injector and a fuel line thereto, engine analysing apparatus comprising:
  pressure sensing apparatus as claimed in claim 1 to be secured to the fuel line;
  means to produce a signal representative of a given crank angle;
  a display device; and
  signal processing means accepting signals from the transducer means and from the crank angle signal means, and to control the display device to display fuel line pressure with respect to crank angle.

13. For a fuel injection engine having a crankshaft, pistons and cylinder means driving the crankshaft, at least one fuel injector and a fuel line thereto, engine analysing apparatus comprising:
  pressure sensing apparatus as claimed in claim 1 to be secured to the fuel line;
  a second pressure sensing apparatus to produce signals representative of pressure variations in the engine cylinder;
  a display device, and
  signal processing means accepting signals from the first and second mentioned pressure sensing means to control the device to display
    (a) cyclic variation of fuel line pressure,
    (b) cyclic variation of cylinder pressure,
    (c) a crank angle datum position.

14. Pressure-sensing apparatus comprising apparatus for sensing pressure variation in a pipe comprising a pair of similar blocks shaped to embrace a pipe over an arc and to make line contact with the pipe at two spaced locations, means to clamp the blocks about a pipe, and a transducer on each block to provide electrical signals in dependence on strain in the block due to periodic dilation of the pipe.

15. Apparatus as claimed in claim 14, wherein each block is adapted to embrace a pipe over substantially a 180° arc thereof as seen in sections and to make line contact with the pipe in the region of radii at 30° and 150° in that arc.

16. Apparatus as claimed in claim 15, wherein each block presents a face to the pipe which is formed on two radii, one larger than the outside radius of the pipe and centred outside the envelope of the block and another radius smaller than the outside radius of the block and centred within the said envelope.

17. Apparatus as claimed in claim 16, each block presenting one face towards the pipe and a second face directed away therefrom, the block in operation of the apparatus bending cyclically in the manner of an arch, said transducer comprising a piezo-electric crystal cemented to the second face of the block to sense said bending thereof.

18. Apparatus as claimed in claim 17, wherein the clamping means for each block comprises a holder defining a central space larger than the block, the block being supported in said space by cast resin surrounding said block, the blocks being metallic and the resin having a hardness and modulus of elasticity less than that of the metal of the blocks, and disengageable retainer means to retain the holders together about a pipe with the blocks in contact therewith.

19. Apparatus for sensing pressure in a pipe comprising:
  a pair of rigid holders each defining a central space,
  a pair of similar metallic blocks one in the central space in each holder,
  cast resin in the central space of each holder surrounding the block, the resin thereby mounting the block in the holder, the resin having a hardness and a modulus of elasticity less than that of the metal of the block,
  each block presenting a concave face towards the pipe and a second face away from the pipe the concave face of each block being formed to extend over an arc of substantially 180° of the pipe and to make the contact therewith in the region of 30° and 150° in that arc, a piezo-electric crystal secured over the second face of each block, means to detachably clamp the holders together about the pipe to hold the blocks in contact therewith whereby cyclical dilation of the pipe causes equal opposed cyclical bending strains in the blocks and thereby equal opposed corresponding electrical signals from the transducers.

20. Pressure-sensing apparatus comprising apparatus for sensing pressure variation in a pipe comprising a pair of similar sensing members shaped to embrace a pipe over an arc and to make line contact with the pipe at two spaced locations, means to clamp the members symmetrically about a pipe, and a transducer on each member to provide electrical signals in dependence on strain in the member due to periodic dilation of the pipe, the signals from the two members being equal and opposite.

21. Apparatus as claimed in claim 20, wherein each member is adapted to embrace a pipe over substantially a 180° arc thereof as seen in sections and to make line contact with the pipe in the region of radii at 30° and 150° in that arc.

22. Apparatus as claimed in claim 21, wherein each member presents a face to the pipe which is formed on two radii, one larger than the outside radius of the pipe and centred outside the envelope of the member and another radius smaller than the outside radius of the member and centred within the said envelope.

23. Apparatus as claimed in claim 21, wherein the sensing members are clamped directly to one another by disengageable retainer means and each sensing member has an integral central portion presenting said faces to the pipe and crystal, which portion moves in the manner of a diaphragm.

24. Apparatus as claimed in claim 20, each member presenting one face towards the pipe and a second face directed away therefrom, the member bending cyclically in the manner of a beam said transducer comprising a piezo-electric crystal cemented to the second face of the member to sense said bending thereof.

25. Apparatus as claimed in claim 20, wherein each sensing member comprises a block, and wherein the clamping means for each block comprises a holder and disengageable retainer means to retain the holders together about a pipe with the blocks in contact therewith.

26. Apparatus as claimed in claim 20, wherein the sensing members are clamped directly to one another by disengageable retainer means.

27. Apparatus as claimed in claim 26, wherein the sensing members and clamping means form a unit.

28. Apparatus as claimed in claim 20, wherein sensing members are hinged together at one side and retained on the other side by disengageable retainer means which is itself hinged to one of the members.

29. Apparatus as claimed in claim 28, wherein the disengageable retainer means is an eye-bolt.

* * * * *